Figure 1:
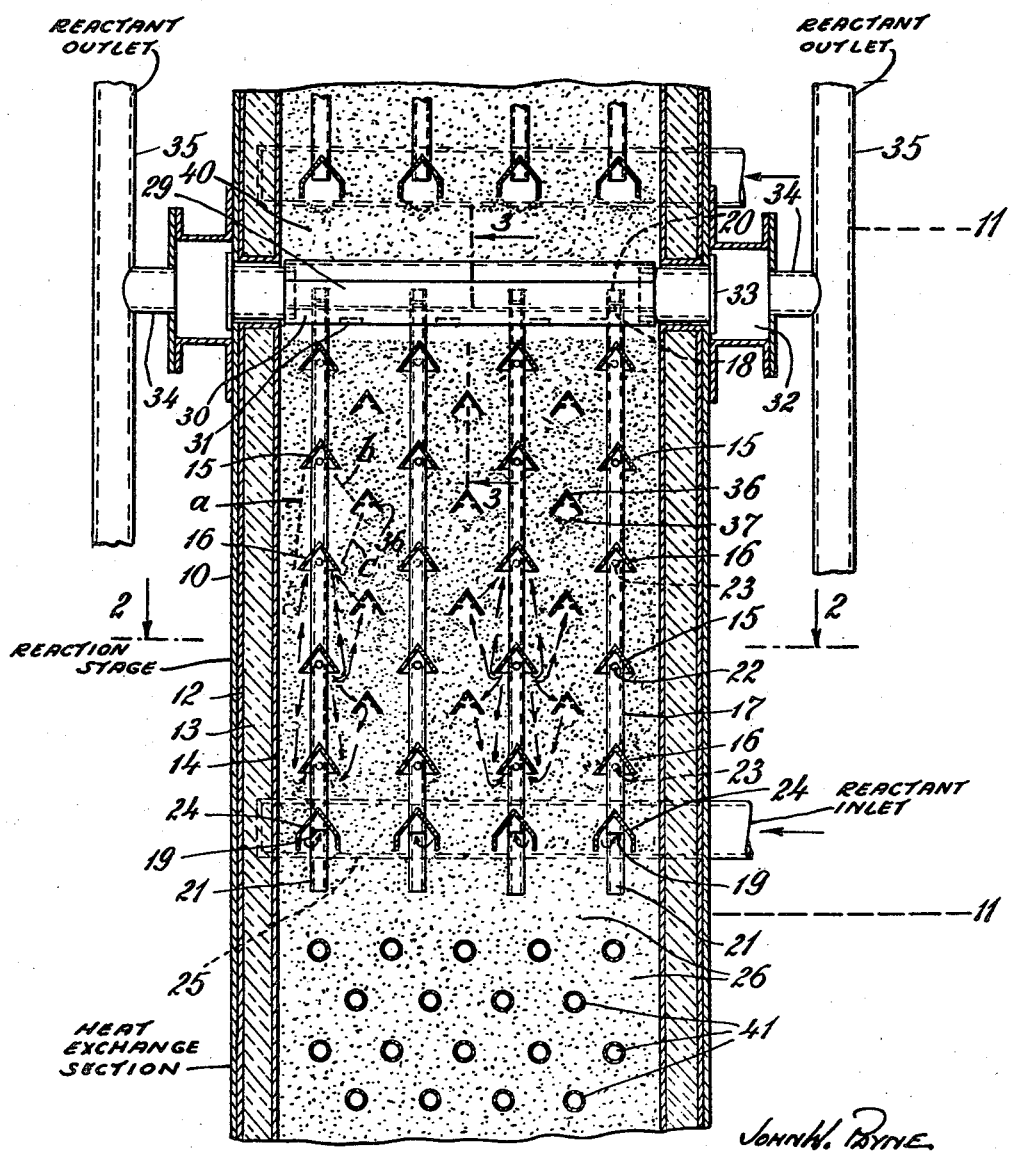

Jan. 4, 1949. J. W. PAYNE 2,458,411
METHOD FOR CONTACTING GASES WITH
A SOLID CONTACT MATERIAL
Filed May 20, 1944 2 Sheets-Sheet 2

JOHN W. PAYNE
INVENTOR

BY
ATTORNEY

Patented Jan. 4, 1949

2,458,411

UNITED STATES PATENT OFFICE 2,458,411

METHOD FOR CONTACTING GASES WITH A SOLID CONTACT MATERIAL

John W. Payne, Woodbury, N. J., assignor to Socony-Vacuum Oil Company, Incorporated, a corporation of New York Application May 20, 1944, Serial No. 536,494

6 Claims. (Cl. 252—242)

This invention has to do with a method for carrying out reactions involving a contact mass of granular or particle form and vaporous reactants. It is particularly concerned with method of this general nature wherein the contact mass flows either continuously or semi-continuously through the reaction zone. This method is applicable to any conversion of this general type and is specifically applicable to such operations as the vapor phase conversion of high boiling point petroleum hydrocarbons to lower boiling point hydrocarbons, to vapor phase oxidation of organic compounds, to polymerization of vaporous compositions and in general to any reaction which may be carried out by contacting of a reactant material in vapor phase with a catalytic material which may take the form of a contact mass material or which may be deposited within or upon such a contact mass material. Since many such reactions require regeneration of the contact mass used and since such regeneration usually likewise takes the form of a contact of gaseous or vaporous reactant with a contact mass, the apparatus and method is also capable of being utilized for such regenerations. As a specific example of a conversion which may be accomplished, there may be cited the above mentioned conversion of high boiling point petroleum fractions to gasoline. Such conversions are usually carried out in the presence of an adsorbent refractory contact mass consisting of associated alumina and silica in granular or pellet form. Such contact masses are frequently referred to as clays. As a specific example of regeneration reactions, there may be mentioned the regeneration of the above contact mass by reacting it with air or oxygen containing gas to remove from it combustible carbonaceous deposits laid down during the conversion.

Proper utilization of contact masses in such processes requires a rather complete diffusion of vaporous reactants into the contact mass. It also requires the capability of passing comparatively large volumes of gaseous reactants through the apparatus without undue pressure drop. In former designs, it usually has been found necessary to sacrifice one of these desirable features to some extent in favor of the other. For example, in a process wherein the reactants are passed through a relatively deep bed of contact mass, limited space velocities of reactant were necessary both to avoid undue pressure drop and to avoid space velocities at which the carrying effect of a reactant would be such as to bring about "boiling" of the contact mass with consequent channeling and ineffective utilization. When some form of structure was utilized which presented a sufficient amount of voids distributed throughout the contact mass to avoid undue pressure drops it became difficult to secure good diffusion of reactants into the contact mass.

An apparatus wherein gaseous reactants are contacted with a moving solid column of contact mass material in such a manner as to provide diffusion of such reactants through such contact mass material, while at the same time permitting relatively high rates of gas flow throughout coupled with relatively low overall pressure drops is disclosed and claimed in United States Patent 2,417,399, issued March 11, 1947. In a preferred form of the apparatus disclosed in that application, gas was introduced to the column of moving solid material through a plurality of vertically spaced inlet distributors extending transversely across the column of solid material and arranged in horizontally spaced vertical rows; and the gas was withdrawn from the column through a plurality of vertically spaced collectors arranged in vertical rows intermediate said rows of distributors.

The instant invention is an improvement over the apparatus above described and is especially directed to a method and apparatus having the advantages of the one above referred to while providing an improvement in the uniformity of solid material contact with the gas throughput in all sections of a reaction zone. In systems wherein a particle form solid material passes downwardly through a reaction zone as a substantially compact column, it is very difficult to prevent at least some of the solid material particles from passing downwardly in substantially the same vertical plane during the entire length of its travel through a reaction zone. In such systems it is important not only to provide uniform rates of gas flow in all parts of the column cross-section, but it is also necessary to provide uniform contact of the solid material in all parts of the column cross-section with gas of the same average composition. Otherwise part of the solid material will be overtreated or over exposed and part will be undertreated or underexposed resulting not only in inefficient use of the solid material but also lack of uniformity in the treatment of the gas throughput.

The improved method disclosed herein provides a novel solution to this difficulty while at the same time providing all of the advantages of the above mentioned apparatus which is the subject of U. S. Patent 2,417,399. As a result, improved treating efficiencies may be obtained and relatively wide spacing of the gas distributor and collector members is permissible in those operations wherein such spacing is desirable. The apparatus disclosed herein is a subject of divisional application, Serial Number 640,363 filed in the U. S. Patent Office on January 10, 1946.

A major object of this invention is the provision of a method wherein gaseous materials may be passed through a moving column of particle form solid material for the purpose of treatment in such a manner as to insure uniform gas flow across substantially the entire column cross-section and uniform contact of substantially all the solid material with both fresh and partially spent gas, while at the same time permitting relatively high rates of gas flow throughout, coupled with a relatively low pressure drop.

Figure 2:
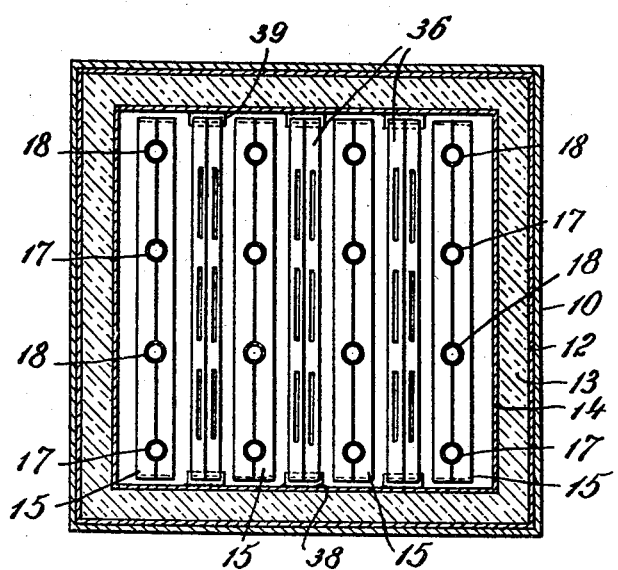
Figure 3:
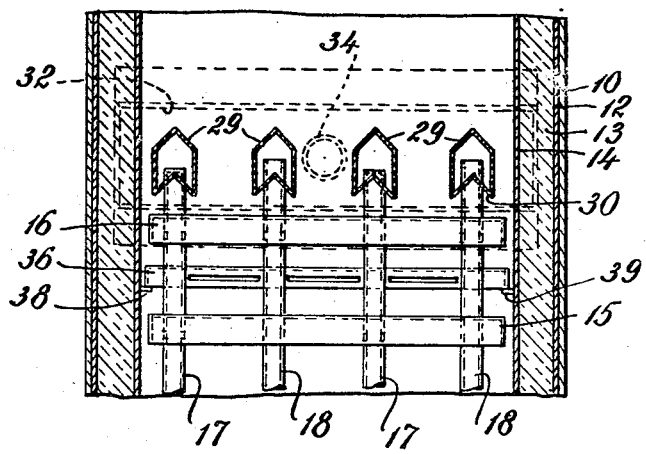

This object and other objects, as will be pointed out hereinafter, have been obtained by the development of method and apparatus which may be more readily understood by referring to the several drawings attached to this specification, in which drawings Figure 1 is an elevational view, partially in section, of the apparatus; Figure 2 is a sectional plan view taken at line 2—2 in Figure 1 and Figure 3 is a sectional view taken along line 3—3 of Figure 1. All of these drawings are highly diagrammatic in form.

Turning now to Figure 1, this figure represents in diagram form a vertical section of an apparatus adapted for carrying out the method steps of this invention for contacting gasi-form reactants with a substantially compact column of downwardly flowing granular or particle form solid material. In this drawing, 10 represents the shell of a reactor and the portion between lines 11 represents one reaction section thereof. A reactor depending upon conditions and capacities to be met may consist of one or more sections similar to that between lines 11; only one such section will be explained in detail. The reactor is lined internally with a thickness of insulation 13 supported between two casing plates 12 and 14. Positioned within the reactor are a plurality of inverted angle shaped troughs such as 15 and 16 which extend transversely across the reactor in a direction perpendicular to the plane of the drawing. These troughs are arranged in a plurality of vertical rows spaced side by side across the reactor, the troughs being vertically spaced apart in said vertical rows. A plurality of vertical tubes are spaced horizontally apart in a direction perpendicular to the plane of the drawing along each row of troughs so that the tubes pass through each trough of each vertical row of troughs. These tubes are of two types, distributing tubes and collecting tubes, arranged alternately in each row. The front row shown in Figure 1 as tubes 17 are distributor tubes which are closed at their upper ends 18 and are open at their lower ends 19. The collector tubes are open on either end and are a little longer than the distributing tubes so that the upper ends 20 and lower ends 21 of these tubes may be seen projecting beyond the ends of the distributing tubes. Perforations or orifices 22 are provided in the distributor tubes at locations under the vertically alternate troughs 15 which serve as distributing troughs, so as to place the interior of said tubes in communication with the space under said troughs. Perforations or orifices are not provided in the distributor tubes at locations under the remaining vertically alternate troughs 16, which are gas collector troughs. Perforations or orifices are provided in the collector tubes under the collector troughs 16 and not under the distributor troughs 15. These latter orifices are represented by the dotted circles 23. Near the bottom of the reaction section a row of horizontally spaced gas inlet hoods 24 are provided, which have angle shaped roofs through which the distributor and collector tubes extend. These gas inlet hoods are open on their inlet ends into a gas inlet duct running behind the reactor shell in a position indicated by dotted lines 25. It will be seen that the gas collector tubes extend through these gas inlet hoods and extend down into the column of particle form solid material in the seal zone 26 below the reaction section, so that the flow of inlet gas into the lower ends of the collector tubes is substantially prevented. Near the top of the reaction section are positioned a row of gas outlet hoods 29 which are shown running horizontally across the reaction section in a direction perpendicular to that of the inlet hoods. These outlet hoods have an inverted angle shaped roof and an upright angle shaped bottom in which slots 31 are provided for escape of entrained solid material. Each of these hoods are open on either end and placed in communication with gas outlet manifold box 32 by means of hollow sleeves 33. Both the distributor and collector tubes extend through the bottom 30 of these hoods and are supported and/or braced thereby. Outlet conduits 34 are provided between the outlet manifold boxes 32 and the gas outlet ducts or stacks 35.

Also positioned within the reaction section are a plurality of deflectors 36, which extend transversely across the section in a direction perpendicular to the plane of the drawings and which are arranged horizontally intermediate the rows of distributor and collector troughs and tubes and vertically intermediate adjacent distributor and collector troughs. These deflectors are in the form of inverted louvered angles, the louvers in the sides of said angles being such as will permit free flow of gas therethrough while substantially preventing flow of particle form solid material therethrough. One or more rows of such louvers may be provided in each side of the deflecting angle. Moreover, in a less preferred modification deflector troughs having perforated sides may be used provided the perforations are such as will prevent passage of the solid particles therethrough. These deflectors thus define substantially solid material free bypass passages for gas flow through portions of the moving solid material column maintained in the reactor during operation. The amount of solid bypass is substantially equal to the vertical distance between the surface of the solid material, represented by dotted lines 37, under such deflector to the louvered openings in the sides of such deflectors. In the preferred modification of this invention, the size and spacing of such deflectors should be such that the distance for vertical gas flow through the solid material between vertically adjacent distributor and collector troughs, represented by dotted line $a$, should be substantially equal to the sum of the straight line distances for gas flow through the solid material from inlet trough 15 to deflector 36, line $b$, plus that from deflector 36 to collector trough 16, line $c$. Under such conditions the gas may flow through the solid material between the distributor and collector troughs with equal ease by either of the two passages, thereby providing uniform gas flow across the entire reactor cross-section.

Turning now to Figure 2, which is a sectional plan view of the reaction section taken at line 2—2 in Figure 1, we find the reactor shell 10, the insulation 13, the distributor troughs 15, the distributor tubes 17 and collector tubes 18 and the deflectors 36. It will be seen that the deflectors 36 are supported on their ends from casing 14 by supports 38 and 39. It will be seen that distributor and collector tubes are arranged alternately in each row thereof. While this is a preferred arrangement, other arrangements may be used. For example, the distributor and collector tubes in each row might be arranged in alternate sets of two.

Turning to Figure 3, which is a sectional view taken at lines 3—3 in Figure 1, we find the shell 10, insulation 13, gas outlet hoods 29 having angled shaped bottoms 30, the distributor tubes 17, the collector tubes 18, the distributor trough 15 and collector trough 16 and the deflector 36. Behind the reactor is shown the gas outlet manifold box 32 and outlet conduit therefrom 34. It will be seen that the upper ends of the gas collector tubes are open while those of the distributor tubes are closed.

Turning again to Figure 1 for a study of the operation, particle form solid material is passed through the reaction section as a substantially compact column of downwardly moving material, sufficient space being provided at either end of the section to provide columns of said material of sufficient length to substantially prevent the flow of gas from the ends of the reaction sections into adjacent sections. Such sections may be called seal zones and are represented at 26 and 40. The rate of flow of the solid material may be suitably controlled by throttling means provided at the bottom outlet from the reaction vessel (not shown). Gaseous reactants enter the inlet hoods 24 from inlet duct 25 and then pass into the distributor tubes 17 through the lower ends theerof. The gas is then distributed by these tubes through orifices 22 under all of the gas distributor troughs 15. The gas then flows through the solid material between distributor troughs in the paths clearly shown by arrowed lines, the flow being both upward and downward between adjacent distributor and collector troughs and part of the flow taking paths through the by-pass passages provided by deflectors 36. The gas is withdrawn from under the collector troughs 16 through orifices 23 into collector tubes 18 through which it flows upwardly, discharging under outlet hoods 29. It is then withdrawn through sleeves 33 into manifold boxes 32 and thence through conduits 34 and ducts 35 to the product recovery system of the process or to a stack depending upon the type of process involved. The distributor and collector troughs and the deflectors 36 act to deflect the flow of the solid material so as to substantially limit the percentage of solid material passing straight through the reaction section in any one vertical plane. Moreover, by the arrangement for gas flow herein provided solid material passing along a vertical plane near the distributor and collector troughs is alternately contacted with fresh and spent reactant gas, and solid material passing along a vertical plane near the deflectors 36 is constantly subjected to a gas which is only partly spent. Consequently, any solid material passing downward through the reaction section along any plane in the reaction zone would be on the average equally exposed to reactant gas of approximately the same average degree of freshness. Not only is this accomplished, but also by provision of paths of flow for gas through the solid material at locations horizontally between vertical rows of distributor and collector troughs, which paths of flow offer no more resistance to gas flow than the direct vertical paths between adjacent distributor and collector troughs, a uniform rate of gas flow is provided throughout the entire reactor cross-section. This permits increased reaction efficiencies especially in those processes wherein the gases are being catalytically converted into valuable gaseous products, such as, for example, the catalytic cracking conversion of hydrocarbon gas oils to gasoline. Inasmuch as the maximum distance for gas flow through the solid material in the reaction zone is only the depth of the bed between gas distributor and adjacent gas collector troughs, very considerable volumes of reactants with respect to the volume of solid material may be handled at relatively low pressure drops.

In some operations, such as for example, the regeneration of contaminant bearing particle form solid adsorbent materials by the action of a combustion supporting gas, it may be desirable to remove or add heat to the solid material. In such operations it is desirable to pass the solid material through a series of superposed regeneration sections or stages such as hereinabove described, each stage being separated by seal zones such as 40 and 26 in Figure 1 to prevent interflow of gas between adjacent stages. The seal zones may be made of sufficient length between at least some of the stages to permit provision of heat exchange tubes therein. Such tubes 41 are shown in the seal zone 26 of Figure 1. A fluid heat transfer medium may be passed through such tubes in such a way as to provide addition or removal of heat to or from the solid material passing through such zones. It is obvious that if Figure 1 were directed only to a single section reactor in which control of solid material temperature was desired prior to entry to the reaction section, that tubes such as 41 could be mounted similarly upwardly of the gas outlet hoods 29.

While the hereinabove described method is a preferred form of this invention, it will be apparent that modified shapes and types of gas distributing members and gas collecting members, and by-pass passage defining deflectors may also be employed within the scope of this invention. Moreover, modified means for distributing the gas to said distributing troughs and collecting gas from said collecting troughs may also be employed. As has been hereinbefore shown, in the preferred embodiment of the invention, it is desirable that the positioning and size of the deflectors 36 of Figure 1, be such that the distance for gas flow through solid material in a substantially vertical path between adjacent gas distributor and collector troughs is substantially equal to the distance for gas flow through the solid material between the same distributor and collector troughs by way of the deflector adjacent thereto. It will be understood, however, that a somewhat less desirable, though still entirely feasible operation may be obtained when the distance for gas flow over the two paths is somewhat different.

It will be understood that the attached drawings and the description of the method of this invention are merely exemplary in nature and are in no way intended to limit the scope of this invention except as it is limited in the following claims.

I claim:

1. In a method for conducting reactions involving a contact mass of granular inorganic material and gasiform reactants the improvement which comprises the steps of passing said granular inorganic contact material to a contacting zone as a substantially compact column of downwardly moving solid material, introducing a gasiform reactant into said column at a plurality of horizontally spaced locations extending transversely of the contacting zone at a plurality of vertically spaced levels, withdrawing gasiform reaction products from said column at a plurality of horizontally spaced locations extending transversely of the contacting zone at a second plurality of vertically spaced levels, said outlet locations being positioned vertically intermediate said inlet locations, deflecting the flowing column of solid material at a third plurality of locations so as to provide a plurality of substantially particle form solid-free by-pass passages for gas flow through portions of the solid material column, said by-pass passages being positioned vertically intermediate said reactant inlet and outlet locations and horizontally outside of the direct passage for gas flow between adjacent reactant inlet and outlet locations, said by-pass passages thereby encouraging more uniform distribution of gas flow across the entire cross-section of said column of flowing particle form solid material.

2. A method according to claim 1 characterized in that the vertical distance of gasiform reactant flow through said column of granular solid material between any two vertically adjacent reactant inlet and outlet locations is substantially equal to the sum of the distances of reactant flow through said solid material between said inlet locations and said by-pass passages and between said by-pass passages and said outlet locations.

3. In a method for conducting thermochemical gaseous reactions in the presence of a particle form solid inorganic catalyst material the improvement comprising the steps of passing said solid inorganic catalyst through a series of superposed reaction zones as a substantially compact column of downwardly moving particle form catalyst while maintaining columns of said downwardly moving catalyst between said reaction zones of sufficient length to substantially prevent interflow of gas between said reaction zones, introducing reactant gas independently to each of said reaction zones along a plurality of horizontally spaced apart lines extending transversely across said column in a plurality of horizontally spaced, parallel vertical rows, withdrawing gaseous reaction products from each of said reaction zones along a second plurality of horizontally spaced apart lines extending transversely across said column in said vertical rows at vertical intervals intermediate said first named lines, deflecting the flow column of catalyst along a plurality of lines extending transversely across said column in each of said reaction zones so as to provide a plurality of substantially solid-free by-pass passages for gas flow through vertical portions of said column of moving catalyst, said by-pass passages being positioned vertically intermediate said lines of gas introduction and withdrawal and horizontally intermediate the vertical rows thereof so as to induce substantially uniform gas flow through the catalyst column across the entire cross-section of the reaction zones.

4. In a method for regenerating particle form solid inorganic adsorbent materials bearing combustible contaminants by combustion in the presence of a combustion supporting gas the improvement that comprises the steps of passing said solid inorganic adsorbent material through a series of superposed regeneration zones as a substantially compact column of downwardly moving particle form solid contact mass material while maintaining columns of said downwardly moving solid material between said regeneration zones, said columns being of sufficient length to substantially prevent the interflow of gas between said regeneration zones, passing a heat exchange fluid in indirect heat transfer relationship with the moving solid material in at least some of said columns intermediate said regeneration zones in order to effectuate the removal of heat from said solid material, introducing combustion supporting gas independently to each of said regeneration zones through a plurality of inlet distributors extending transversely across each of said zones and vertically spaced therein in a plurality of horizontally spaced, parallel vertical rows, withdrawing gaseous products from each of said regeneration zones through a plurality of outlet collectors vertically spaced intermediate said gas distributors in said vertical rows thereof, deflecting the column of moving solid material at a plurality of locations extending transversely across each of said regeneration zones so as to provide a plurality of substantially solid-free by-pass passages for gas flow through vertical portions of said column of moving solid material, said by-pass passages being positioned vertically intermediate said gas inlet and outlet locations and horizontally intermediate the vertical rows thereof so as to induce substantially uniform gas flow through the solid material column across the entire cross-section of the regeneration zones.

5. In a method for conducting reactions involving gasiform reactants in the presence of a particle form solid inorganic contact mass material the improvement which comprises the steps of passing said particle form solid inorganic adsorbent material through a reaction zone as a substantially compact column of downwardly moving solid material, introducing the reactant gas to said column along a plurality of horizontally spaced lines extending transversely across said column in a plurality of horizontal rows spaced apart along the length of said column, withdrawing gaseous reaction products from said column along a second plurality of horizontally spaced lines extending transversely across said column in a second plurality of horizontal rows longitudinally displaced along said column from said first named rows, deflecting the flowing column of solid material along a third plurality of horizontally spaced lines to form a plurality of substantially particle free gas spaces extending transversely across said column at levels between said lines of gas introduction and gas withdrawal, said gas spaces being horizontally displaced within said column from the vertical planes through said lines of gas introduction and said lines of gas withdrawal, causing a portion of the gas introduced along said first named lines to flow through said column by the shortest route to the nearest adjacent lines of gas withdrawal and causing another portion of said gas introduced along said first named lines to flow through said column to the nearest adjacent gas spaces and then from said gas spaces to the nearest adjacent lines of gas withdrawal.

6. In a method for regenerating particle form solid inorganic catalyst bearing combustible carbonaceous contaminants by combustion in the presence of a combustion supporting gas the improvement that comprises the steps of passing said particle form solid inorganic catalyst material through a regeneration zone as a substantially compact column of downwardly moving solid material, introducing an oxygen containing gas to said column at a plurality of horizontally spaced apart locations extending transversely across said column in a plurality of horizontally spaced, parallel vertical rows, deflecting the flowing column of solid material at a second plurality of locations extending transversely across said column to provide a plurality of substantially solid excluded by-pass passages for gas flow through vertical portions of said column, said by-pass passages being displaced longitudinally along said column from said locations of gas introduction and being displaced horizontally intermediate the vertical rows thereof, withdrawing gaseous regeneration products from said column at a third plurality of horizontally spaced apart locations extending transversely across said column in the same vertical rows as said locations of gas introduction but displaced longitudinally along said column from said locations of gas introduction and from said gas by-pass passages so that the gas by-pass passages are displaced vertically along said column substantially midway between locations of gas introduction and gas withdrawal, causing a portion of the gas introduced into said column to flow through said column substantially in the shortest vertical path between adjacent gas inlet and outlet locations, causing another portion of the gas introduced into said column to flow through the column from the locations of introduction to said gas by-pass passages and then to flow through said column from said gas by-pass passages to the nearest adjacent locations of gas withdrawal.

JOHN W. PAYNE.

REFERENCES CITED

The following references are of record in the file of this patent:

UNITED STATES PATENTS

| Number | Name | Date |
| --- | --- | --- |
| 921,097 | Ellis | May 11, 1909 |
| 1,987,903 | Houdry | Jan. 15, 1935 |
| 2,330,710 | Hemminger | Sept. 28, 1943 |
| 2,409,596 | Simpson | Oct. 15, 1946 |
| 2,417,399 | Simpson | Mar. 11, 1947 |
| 2,419,245 | Arveson | Apr. 22, 1947 |